US007478183B2

(12) United States Patent
Pathak et al.

(10) Patent No.: US 7,478,183 B2
(45) Date of Patent: Jan. 13, 2009

(54) METHOD AND SYSTEM FOR N DIMENSION ARBITRATION ALGORITHM—SCALABLE TO ANY NUMBER OF END POINTS

(75) Inventors: Akshay Pathak, Noida (IN); Quang Phung, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 196 days.

(21) Appl. No.: 11/417,618

(22) Filed: May 3, 2006

(65) Prior Publication Data

US 2007/0260792 A1  Nov. 8, 2007

(51) Int. Cl.
*G06F 13/00* (2006.01)
(52) U.S. Cl. .................. 710/116; 710/113; 710/120; 710/243
(58) Field of Classification Search ................ 710/107, 710/113, 116, 120, 243
See application file for complete search history.

(56) References Cited

U.S. PATENT DOCUMENTS

| 4,363,096 | A | * | 12/1982 | Comfort et al. | 710/243 |
|---|---|---|---|---|---|
| 5,274,774 | A | * | 12/1993 | Manber et al. | 710/125 |
| 5,623,672 | A | * | 4/1997 | Popat | 710/240 |
| 5,930,487 | A | * | 7/1999 | Story et al. | 710/120 |
| 5,996,037 | A | * | 11/1999 | Emnett | 710/117 |
| 6,467,002 | B1 | * | 10/2002 | Yang | 710/116 |
| 7,007,123 | B2 | * | 2/2006 | Golla et al. | 710/243 |
| 7,039,736 | B2 | * | 5/2006 | Mantey et al. | 710/113 |
| 7,143,219 | B1 | * | 11/2006 | Chaudhari et al. | 710/111 |
| 2003/0097505 | A1 | * | 5/2003 | Kato | 710/113 |
| 2007/0260793 | A1 | * | 11/2007 | Chou et al. | 710/243 |

OTHER PUBLICATIONS

Vernon, M.K.; Manber, U, Distributed Round-Robin And First-Come First-Serve Protocols And Their Application To Multiprocessor Bus Arbitration, Computer Architecture, 1988. Conference Proceedings. 15th Annual International Symposium on May 30-Jun. 2, 1988, pp. 269-277.

* cited by examiner

*Primary Examiner*—Glenn A Auve
(74) *Attorney, Agent, or Firm*—Trellis IP Law Group, PC

(57) ABSTRACT

A method, a system and a computer programmable product have been provided for arbitrating bus cycles among a plurality of device nodes. Requests for bus grant are received from the device nodes. Each request includes values of one or more arbitration parameters. The requests grouped at a first stage, with two requests in each group. A comparison is performed in each group, based on the values of the one or more parameters. Further, winners from each comparison are forwarded to a next stage. Subsequently, comparisons are performed over one or more stages to select a winner of the bus grant.

20 Claims, 6 Drawing Sheets

METHOD AND SYSTEM FOR N DIMENSION ARBITRATION ALGORITHM—SCALABLE TO ANY NUMBER OF END POINTS

BACKGROUND OF THE INVENTION

1. Field of Invention

Embodiments of the invention relate, in general, to bus arbitration in a network of devices. More specifically, embodiments of the invention relate to multi-port bus arbiters.

2. Description of the Background Art

In network architecture, a bus is a subsystem that transfers data between various connected device nodes. The device nodes may be devices such as Central Processing Units (CPU), Direct Memory Access (DMA) controllers, etc. The bus logically connects the device nodes over a single set of wires. Further, one device node can transfer data over the bus at a point of time. Transfer of data is termed as a transaction. With regard to the transaction over the bus, time is divided into clock cycles called bus cycles that synchronize the bus operations. The device node has to send a request and receive a bus grant from a bus-control mechanism to perform the transaction.

In busy systems, a number of device nodes often simultaneously request the bus grant. In such a case, a control mechanism called bus arbitration has to decide upon the device node that gets the bus grant. Bus arbitration is a technique that selects one device node out of a number of requesting device nodes and grants bus cycles to that particular device node. Bus arbitration is based on a bus arbitration algorithm. The bus arbitration algorithm selects one device node to which the bus will be granted. Arbitration criteria used to make a grant decision can include priority of a device, priority of a data packet, byte count, number of bytes per second, and so forth. The time taken to make a single bus arbitration decision is termed as an arbitration cycle.

Various bus arbitration algorithms are being used for arbitration applications. One existing algorithm takes a single criterion input from each device node that is requesting the bus grant. In case more than one device node provides an identical value of the criterion to create more than one identical-priority requests at the same time, a simple round-robin is employed as a tie-breaker to grant bus cycles. Another existing algorithm uses more than one criterion from each device node requesting the bus grant. However, increase in the number of criteria and the number of device nodes in the system leads to complexity in the algorithm. Therefore, implementation of the bus arbitration algorithm becomes difficult.

One of the existing techniques described in the US patent publication 20030188065 is based on a binary tree concept. The algorithm relies on nodes in the binary tree to forward arbitration decisions along tree branches up to the root of the binary tree. The root signifies the one device node that is selected by the algorithm to receive the bus grant. However, each node has to indicate a flag for the selection of a left or a right branch of the node. The flag indication is based on the probability of priority of the left and right branches. The probability is based on several decision criteria clustered together. In general, priority of request, which may be one of the decision criteria, has only two levels, high and low. Moreover, consideration of multiple priorities leads to queuing up of lower priority requests for long durations. Further, the priority values are limited. They cannot be varied across a range of values. The device node that is selected at the completion of the arbitration has to be informed regarding its selection by a downward traversal of the binary tree. This technique takes into account an increase in the number of device nodes as well as decision criteria. However, as the complexity of the algorithm increases, more processing power is required to implement the technique. Moreover, hardware cost also increases in proportion to the complexity of the algorithm.

DETAILED DESCRIPTION OF EMBODIMENTS OF THE INVENTION

Figure 1:
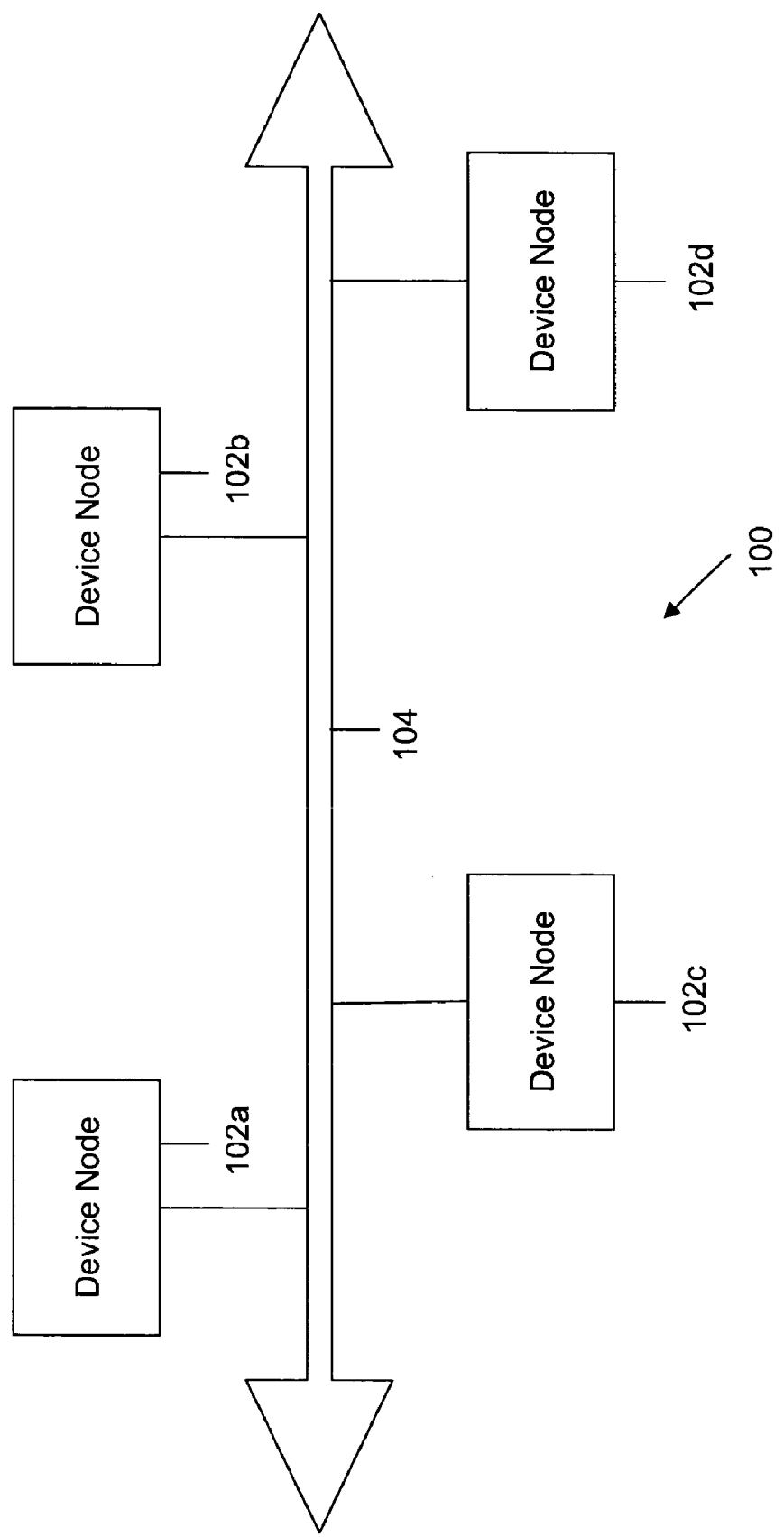
FIG. 1 illustrates an environment for implementing an exemplary embodiment of the present invention.

Embodiments of the invention provide a method, a system, and a computer-readable medium for arbitrating bus cycles among a plurality of device nodes. Requests for a bus grant are received from the plurality of device nodes. The requests are compared on the basis of one or more parameters for arbitration. The comparison is performed using binary comparators and a winner device node is selected. The winner device node is granted the bus. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Embodiments of the invention provide an n-dimension bus arbitration algorithm. The bus arbitration algorithm uses a binary tree. Multiple device nodes compete for bus cycles to perform a data transfer or a transaction over a bus. Each device node generates a request for bus grant to perform the transaction over the bus. The request comprises values of the one or more parameters for arbitration. The dimension of the bus arbitration algorithm relates to the number of the parameters for arbitration. Further, the bus arbitration algorithm is scalable in relation to its ability to add or remove device nodes as needed into the system to form a binary tree. The requests are received from the device nodes and associated parameters of the requests as inputs to the bus arbitration algorithm. A two-input (binary) comparator is used as a basic element to implement the bus arbitration algorithm. At a first stage, the inputs from two adjacent device nodes are grouped and fed into the binary comparator. Device nodes having adjacent network addresses are the adjacent device nodes. An arbitration decision is made by the binary comparator to select one device node from the two adjacent device nodes. The arbitration decision is taken in two phases. In the first phase, the inputs are compared to select a parameter-based winner device node on the basis of each parameter. The parameter-based winner device node is a device node that has a higher or preferred value of the parameter. In the second phase, from the parameter-based winners, the one device node from the two adjacent device nodes is selected. Similarly, all inputs are grouped and compared in binary comparators to select one device node from each comparison. Thereafter, the requests from the selected device nodes along with the values of parameters for arbitration are forwarded as inputs to a second stage. The values of the parameters for arbitration remain unchanged. Further, at the second stage, adjacent inputs are fed into the binary comparators, with each binary comparator taking two inputs.

The binary comparators remain the same for every stage, and take the arbitration decision (as described in the first stage). In the second stage, number of inputs and number of binary comparators are reduced to half of the number of inputs and the number of binary comparators respectively at the first stage. Subsequently, the arbitration decision from the second stage is forwarded to a next stage. The arbitration is performed and the arbitration decision forwarded iteratively over one or more stages to finally select one winner device node that receives the bus grant.

Referring now to the drawings, particularly by their reference numbers, FIG. 1 illustrates environment 100, wherein various embodiments of the invention can be performed. Environment 100 includes device nodes 102 and bus 104. Device nodes 102 are connected to bus 104. Device nodes 102 may be devices within a digital hardware such as a motherboard, a Printed Circuit Board (PCB), a System on Chip (SoC), among others. For example, device node 102 may be a memory controller, an interrupt controller, a DMA (Direct Memory Access) controller, a RAM, a sound card, a video card, etc. Moreover, device nodes 102 may be devices in a LAN, WAN or a fiber optic network, where devices in one part of a network are connected to another part through a router or a switch. For example, device nodes 102 may be CPUs, printers, scanners, facsimile devices, etc. Bus 104 is a combination of a set of data lines and a clock. The clock synchronizes data transfer over the data lines of bus 104. Bus 104 may be a Peripheral Component Interconnect (PCI) bus, an Industry Standard Architecture (ISA) or a Universal Serial Bus (USB) bus in a personal computer (PC).

Bus arbitration in environment 100 can be explained with an example. Device node 102a, referred as a first initiator device node, makes a request to read data from device node 102c, referred as a first target device node. The initiator device node is a device node that initiates or makes a request, whereas the target device node is a device node that receives the request. Simultaneously, device node 102b, referred as a second initiator device node, makes a request to write data to device node 102d, referred as a second target device node. In this case, since the first and the second initiator device nodes are competing to make a transaction, the bus operation has to be synchronized so that only one transaction takes place at a time to avoid error in the transaction. This is achieved by using a bus arbitration system described in more detail in conjunction with FIG. 2.

Although only four device nodes have been depicted in FIG. 1, to illustrate the environment of the invention, it should be apparent that any number of device nodes may be used.

Figure 2:
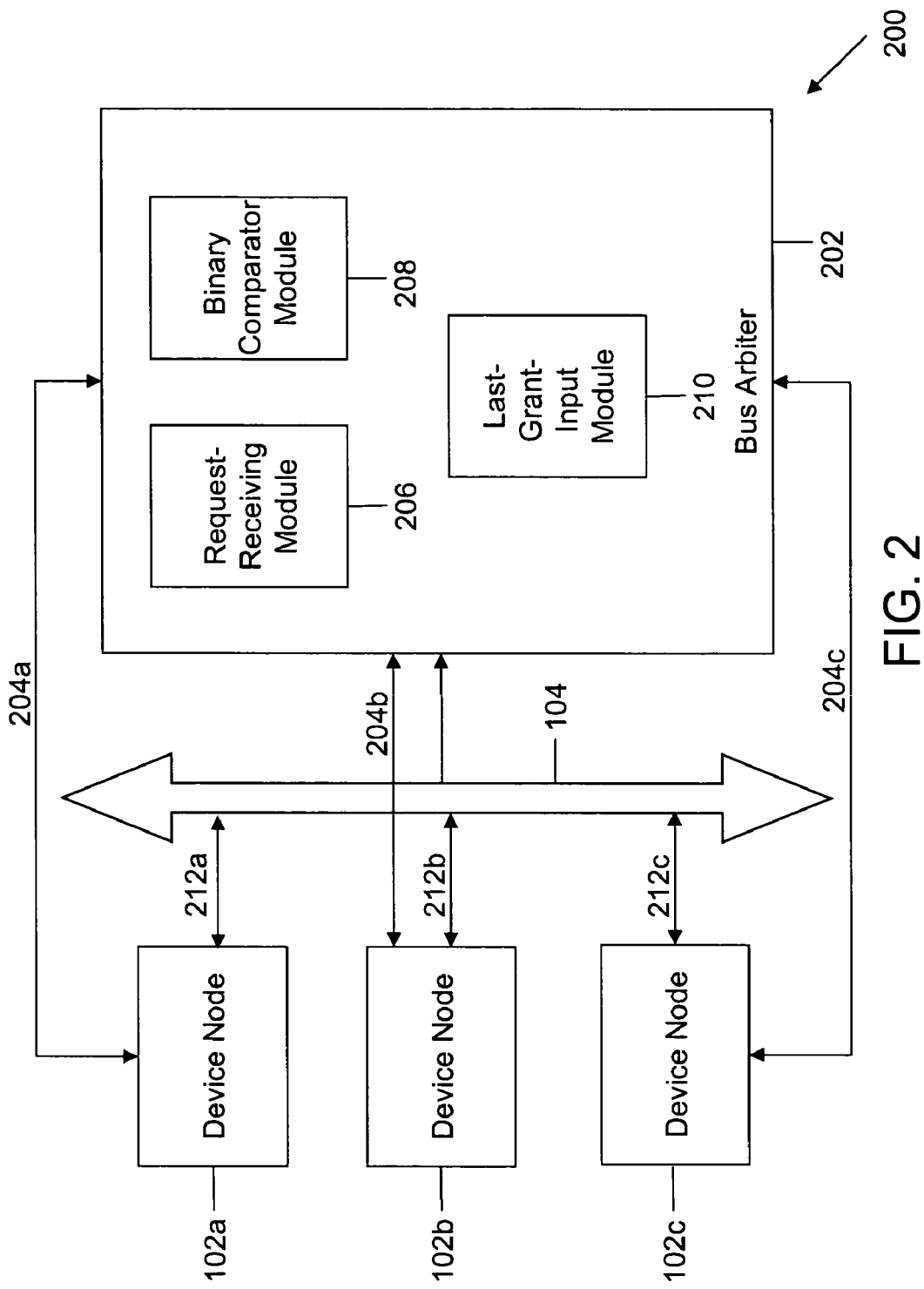
FIG. 2 illustrates a bus arbitration system, in accordance with an exemplary embodiment of the invention.

FIG. 2 illustrates bus arbitration system 200, in accordance with an exemplary embodiment of the invention. Bus arbitration system 200 includes device nodes 102, bus 104 and bus arbiter 202. Device nodes 102 and bus arbiter 202 communicate through request/grant messages 204. Bus arbiter 202 includes request-receiving module 206, binary comparator module 208 and last-grant-input module 210. Bus arbitration system 200 further includes connectors 212 that connect device nodes 102 to bus 104.

Each device node 102 makes a request for bus grant using request/grant message 204 at bus arbiter 202 to perform a transaction or data transfer over bus 104. The transaction may be any type of operation, command or resource request, such as a read operation, write operation, edit operation, print operation, save operation, etc. Each request/grant message 204 includes a device node number and corresponding values of the arbitration parameters. The device node number is a unique device identifier for each device node.

In case of a grant, request/grant message 204 may include the device node number and the priority of the selected device node. The grant is an output message from bus arbiter 202. The output from bus arbiter 202 may also include a variable called target selected. The target selected is the device node to be accessed in the transaction requested by device node 104. Request/grant messages 204 are based on request-arbitrate-grant protocol. The request-arbitrate-grant-protocol defines communication messages' format in the process of bus arbitration.

Bus arbiter 202 receives additional inputs such as a bus cycle field, header parity error and target selected. The bus cycle field contains a number of valid bus cycles granted for an ongoing transaction. In an embodiment of the invention, the number of bus cycles ranges from one to nine. The header parity error indicates a bad request. Bus arbiter 202 ignores any request with header parity error as well as reports back such error to the device node from which the request was received. The target selected indicates the intended recipient of the transaction initiated by a particular initiator device node. The additional inputs are used in a pre-arbitration phase to filter out a bad request. The pre-arbitration phase includes registering and validating all the requests at arbiter 202 before making the arbitration decision. Registering a request includes accepting the request and the values of the parameters associated with the request. Validating the request ensures that a bad request is not arbitrated. A bad request is the request with a header parity error. The additional inputs are further used in the post-arbitration phase when a winner device node is selected. For example, the bus cycle field of the winner device node is used as input to a subsequent arbitration cycle.

The time taken by arbiter 202 including the pre-arbitration phase and the post arbitration phase is termed as arbiter latency. The post-arbitration phase includes routing the request from the initiator device node to the target device node through a multiplexer. All the requests are fed as inputs to arbiter 202 as well as the multiplexer. The output of arbiter 202 acts as a selecting input at the multiplexer. In accordance with the selecting input, request from the winner device node only is routed. Arbiter latency takes care of the delay caused in registering, validating, and arbitrating the requests and further granting and routing the selected request.

Arbitration parameters include the criteria on which the arbitration decision is based. The arbitration parameters may include a priority of a device node, priority of the request, number of bytes per second, byte count of data packets to be transferred, etc. The priority of request may also be termed as the priority of requesting packet. In a preferred embodiment, the priority of requesting packet is used as a parameter of arbitration. A request with a higher value of priority wins the arbitration decision. The priority of requesting packet may have a value greater than or equal to zero. The value may be given in one or more digital bits. The more the number of digital bits, the more the resolution of the priority. The resolution determines how fine or granular a priority value will be. In a preferred embodiment of the invention, priority values are represented by four-bit values. Therefore, there can be 16 priority values ranging from zero to fifteen. The number of bytes per second is the intended data-flow rate in the requested transaction. The byte count indicates the size of the transaction in bits or bytes.

Further, the round-robin criterion is another parameter for arbitration that may be used as a tie-breaker, if one or more criteria are to be resolved. The round-robin criterion is used if two requests are found to have the same value of an arbitration parameter in a comparison. According to the round-robin criterion, if device nodes $102a$, $102b$ and $102c$ are traversed sequentially, then a device node, just after the last granted device node, wins in the comparison. The last granted device node is the device node that won in the last arbitration cycle. Arbitration cycle is a time period used to complete one bus arbitration decision from receiving requests for bus grant to sending bus grant message. For example, let the requests from device nodes $102b$ and $102c$ have same priority value. Further, corresponding to the same priority value, device node $102a$ won in the last arbitration cycle. In this case, device node $102b$ wins the comparison, based on the round-robin criterion.

Connectors 212 connect device node 102 to bus 104. Connectors 212 enable communication in two ways. For example, a read transaction causes input of some data to device node 102. A write operation causes a write transaction from device node 102.

Request-receiving module 206 receives the requests in request/grant messages 202. Request-receiving module 206 includes input channels, wires or pins that transfer request/grant messages 204 to and from bus arbiter 202. For example, request-receiving-module 206 are input pins of an Integrated Chip (IC). The requests for bus grant in request/grant messages 204 are transferred to binary comparator module 208 as inputs through electrical connections. The electrical connections may be solder connections, metallic connectors on board, and the like. Binary comparator module 208 performs the arbitration decision among the received requests. The output from binary comparator module 208 is one request/grant message 204. Binary comparator module 208 includes a number of binary comparators as described in detail in conjunction with FIG. 3. A binary comparator compares two inputs, based on the parameters for arbitration, selects one device node from the comparison. The output from the binary comparator includes device node number of the selected device node.

Last-grant-input module 210 includes means to store a last grant input vector at bus arbiter 202. For example, a memory chip, integrated on bus arbiter 202. The last grant vector is an array of last grant device node numbers with priority as the last grant vector's index or address. The priority may be the priority of requesting packet. Each array index stores last granted device node number with the priority matched to the index. If the priority is a four-bit number, then the last grant vector is a 64-bit array with four bits assigned for each priority level or index. For an arbitration decision, the binary comparator takes two inputs, with each input including device node number and values of the parameters for arbitration. If there is a tie on a priority, the binary comparator looks up the last granted vector, to check which device node got the last grant corresponding to the same priority. The binary comparator further decides which input will be selected for the next bus grant.

Figure 3:
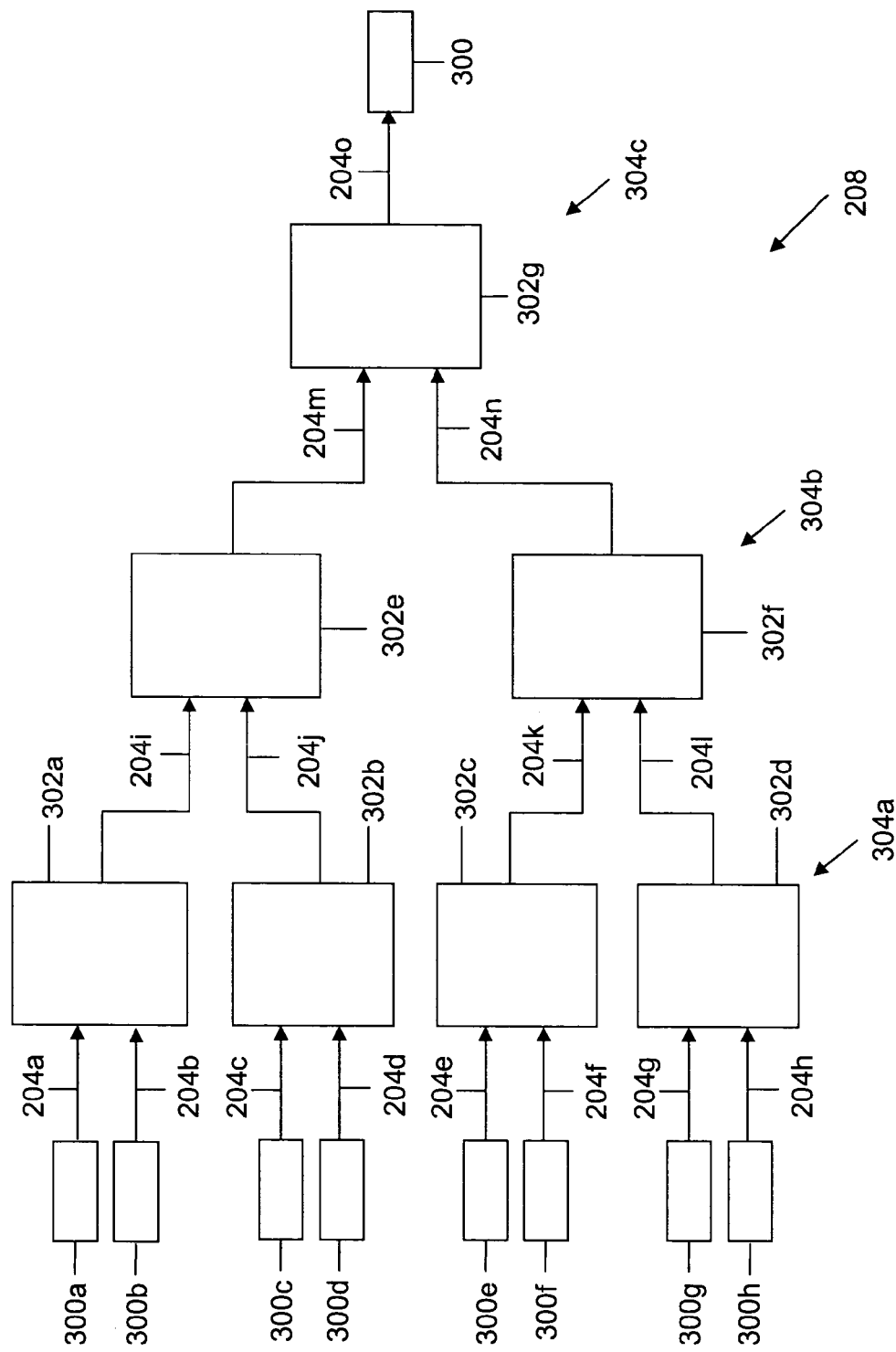
FIG. 3 illustrates a binary comparator module, in accordance with an exemplary embodiment of the invention.

FIG. 3 illustrates binary comparator module 208, in accordance with an exemplary embodiment of the invention. Binary comparator module 208 includes a predefined number of binary comparators, each binary comparator receiving two inputs. Binary comparator module 208 having $2^n$ inputs has $(2^n-1)$ binary comparators. Device nodes 300 request for bus grant at the same time. The requests are received in pairs of two requests as inputs to binary comparators 302 at first stage $304a$. The requests are compared and the arbitration decision forwarded to second stage $304b$. From second stage $304b$, arbitration decision includes two device nodes. The arbitration decision is forwarded to third stage $304c$, which is the last stage. The arbitration decision from the last stage is given as the output of bus arbiter 202. Each request is received as request/grant message 204 at bus arbiter 202 that transfers the requests to binary comparator module 208. Request/grant messages 204 include the device node number and values of the parameters for arbitration corresponding to device node 300.

For example, request/grant message $204a$ from device node $300a$ and request/grant message $204b$ from device node $300b$ are received at binary comparator $302a$. Binary comparator $302a$ performs the arbitration decision and provides one selected device node in output. The output from binary comparator $302a$ is the grant contained in request/grant message $204i$. Similarly, outputs from binary comparators $302b$, $302c$, and $302d$ are request/grant messages $204i$, $204j$, $204k$ and $204l$, respectively. The number of binary comparators and the outputs at first stage $304a$ is half of the number of device nodes 300 as one binary comparator receives two inputs. The outputs at the first stage are again paired as inputs to binary comparators 302 at a second stage. The arbitration decision at second stage $304b$ is grants given as request/grant messages $204m$ and $204n$. The output at the second stage further acts as input to third stage $304c$. The inputs are fed into binary comparator $302g$ and a final winner device node is selected from third stage $304c$. The winner device node is informed about the bus grant by request/grant message $204o$. The winner device node receives the bus grant decision intimation in the form of request/grant message $204o$.

In an embodiment of the invention, if the number of device nodes 300 is odd, then one remaining request at first stage $304a$ is carried forward to second stage $304b$. The arbitration decision is then taken in second stage $304b$, where the remaining request is compared with one of the outputs from the first stage. The arbitration decision, therefore, follows the binary tree concept. Binary comparators 302 are arranged as in the binary tree, where the number of binary comparators 302 reduces by a factor of half at each subsequent stage. As the number of device nodes 300 increases, more binary comparators may be added and arbitration decision may be taken in a greater number of stages. The winner device node is always selected following the same algorithm. Further, as the number of the parameters for arbitration increases, software and hardware in binary comparators 302 is modified. Therefore, the dimension of the bus arbitration algorithm may be increased or decreased as desired.

Figure 4:
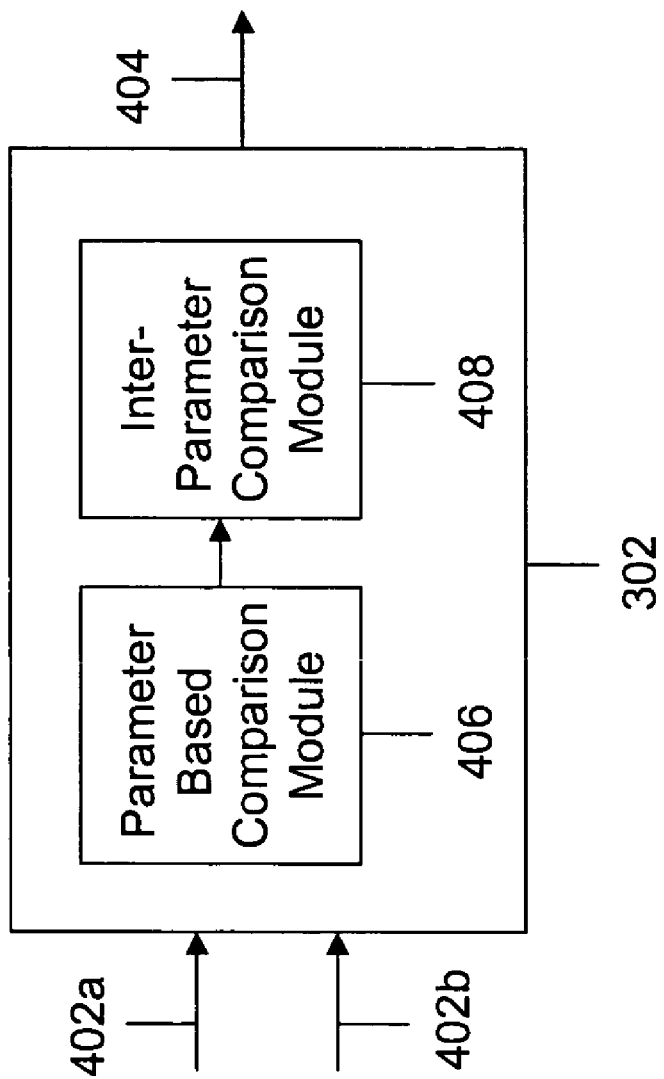
FIG. 4 illustrates a binary comparator, in accordance with an exemplary embodiment of the invention.

FIG. 4 illustrates binary comparator 302, in accordance with an exemplary embodiment of the invention. Binary comparator 302 receives two inputs $402a$ and $402b$ and one output 404. Further, binary comparator 302 includes parameter-based comparison module 406 and inter-parameter comparison module 408. Inputs 402 are requests for bus grant from device nodes 300 received in the form of request/grant messages 204. The output is a grant notice in the form of request/grant message 204. Parameter-based comparison module includes means to compare inputs 402, based on the value of each parameter for arbitration. The means to compare may include hardware to carry out a parallel processing. For each parameter, one comparison is performed between inputs 402. The winner from each comparison is a parameter-based winner device node. The parameter-based winner device nodes are further compared in inter-parameter comparison module 406. Inter-parameter comparison module 406 is based on a priority encoding scheme or any other applicable scheme such as a majority scheme. The priority-encoding scheme implements a selection function where the bus is granted to the request with the highest priority. For the majority scheme, the device node that wins more frequently in the parameter-based comparison module will be the winner in the inter-parameter comparison. Further, in case of a tie, round-robin criterion may be applied.

Figure 5:
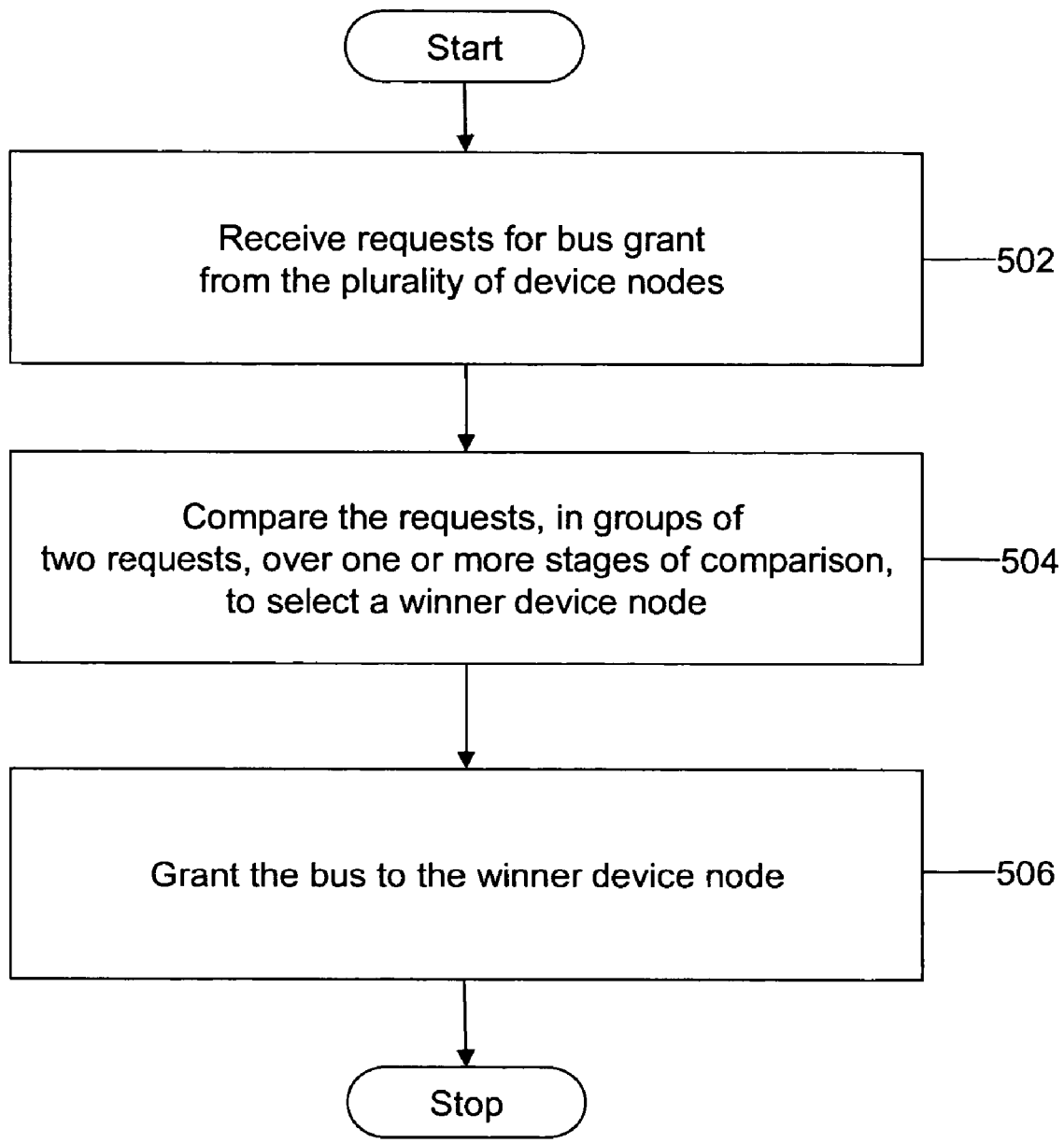
FIG. 5 is a flowchart, illustrating a method for arbitrating bus cycles among a plurality of device nodes, in accordance with an exemplary embodiment of the invention.

FIG. 5 is a flowchart of a method for arbitrating bus cycles among a plurality of device nodes, in accordance with an exemplary embodiment of the invention. At step 502, requests for bus grant are received at bus arbiter 202 from device nodes 300. The bus grant is requested in order to perform a transaction over the bus. Each request includes values of the parameters for arbitration. At step 504, the requests are compared in binary comparator module 208 in groups of two requests, over one or more stages of comparison, to select a winner device node. The requests are paired to feed two inputs to each binary comparator at first stage 304a. The winners from each binary comparator at first stage 304a are fed into binary comparators at second stage 304c. The comparisons continue until the winner device node is selected. At step 506, the bus is granted to the winner device node. The number of comparisons is halved at each stage as compared to the previous stage. The number of inputs to the first stage may be variable. For example, the number of binary comparators required for five to six is three, for seven to eight inputs is four. Further, the number of binary comparators required for nine to ten inputs is five and for eleven to twelve inputs is six, and so on.

Receiving requests and comparing the requests forms one cycle of bus arbitration. Arbitration decision is made only during one cycle, i.e., the arbitration cycle, before bus arbiter 202 grants the next transaction. When the bus is idle, arbiter 202 does not perform any arbitration and drives NULL cycles over the bus. In case of NULL cycles, the output or the grant in the form of request/grant message 204 as well as the target selected variable hold no value.

Figure 6:
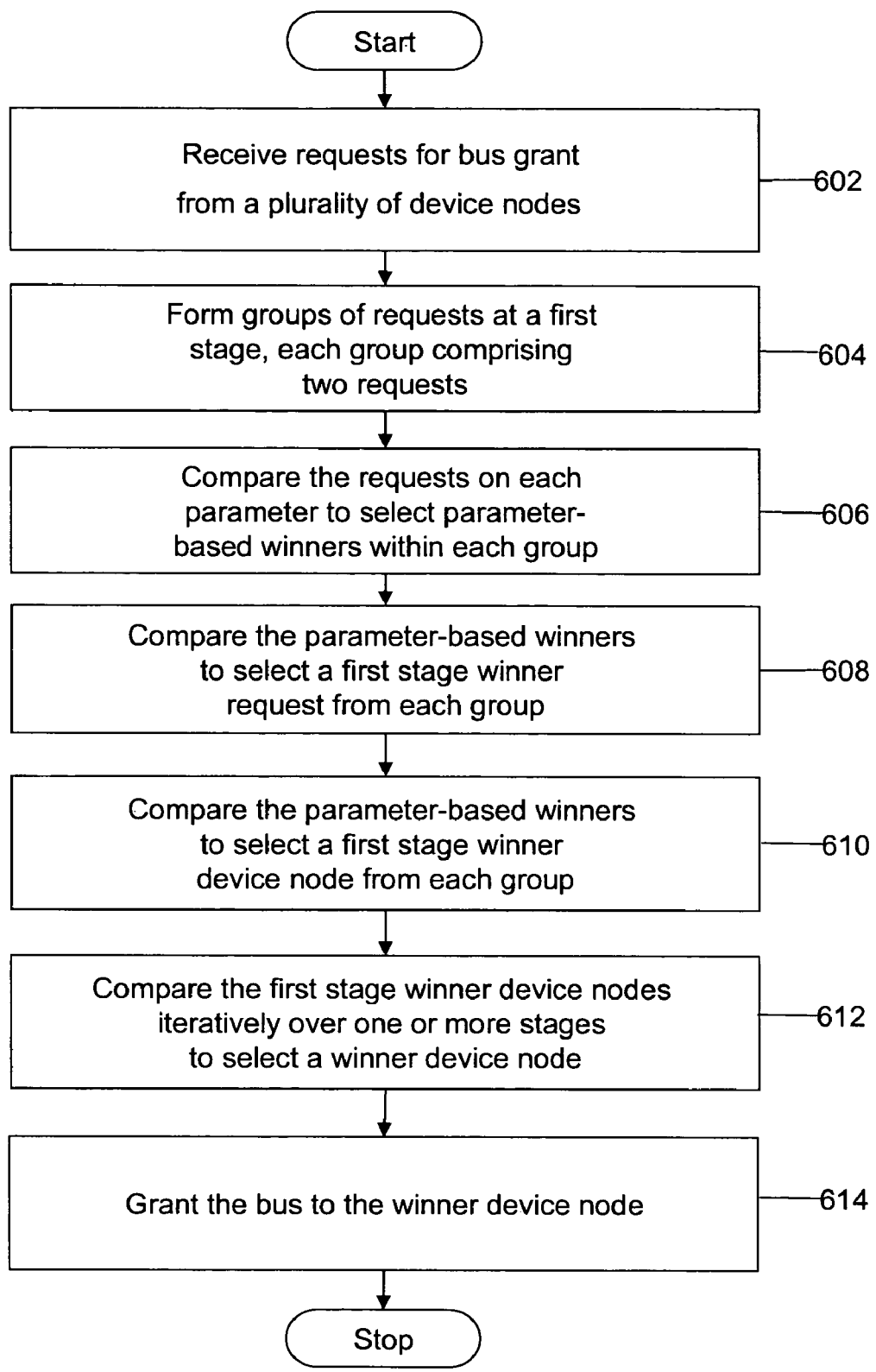
FIG. 6 is a flowchart, illustrating a method for arbitrating bus cycles among a plurality of device nodes, in accordance with another exemplary embodiment of the invention.

FIG. 6 is a flowchart of a method for arbitrating bus cycles among a plurality of device nodes, in accordance with another exemplary embodiment of the invention. At step 602, requests are received from device nodes 102 at bus arbiter 202. At step 604, groups are formed from the requests at first stage 304a, each group containing two requests from adjacent device nodes. The grouped requests are fed as inputs to binary comparator 302, which is a part of bus arbiter 202. At step 606, the requests within each group are compared by parameter-based comparison module 406, to select a parameter-based winner device node from each comparison. In case there is a tie for a parameter for arbitration, the round-robin criterion is used to resolve the tie. The last grant vector is used to resolve the tie. The parameter-based winner device nodes within each group are compared by inter-parameter comparison module 408. The output from inter-parameter comparison module 408 is the output of binary comparator 302. The output from binary comparator 302 includes a device node number and values of the parameters for arbitration associated with the device node selected by binary comparator 302. Outputs of binary comparators 302 are the selected device nodes from the first stage comparisons. At step 612, winner device nodes from the first stage comparisons are compared iteratively over one or more stages to select the winner device node. At step 614, the bus is granted to the winner device node.

If there are more than two device nodes with the same priority requesting the bus at a time, then round-robin is used to break the tie. Each binary comparator 302 selects one device node based on round-robin criteria. In the next stage, different binary comparators again pair up the selected device nodes from the previous stages. Finally, one device node selected in the last stage gets the bus grant. In the arbitration cycle, arbiter 202 arbitrates among all the requests present at that time to make the arbitration decision. Therefore, there may be new requests or some remaining requests from the previously dropped-out arbitration cycles.

In an embodiment of the invention, device node 300 is a single device node requesting for the bus grant. In one case, device node 300 requests the bus grant for the transaction and de-asserts the request after receiving the bus grant. Device node 300 receives the bus grant on the completion of two bus cycles after the assertion of the request. The two bus cycles are on account of the arbiter latency. The transaction continues for a predetermined number of bus cycles. The predetermined number of bus cycles is given in a transaction header that includes more information related to the transaction. The predetermined number of bus cycles is at least one. In another case, device node 300 continues to assert the request to perform one or more transactions. As a result, bus arbiter 202 provides back-to-back grants to device node 300. The back-to-back grants to the same initiator device node are spaced at least two bus cycles apart. In an embodiment of the invention, bus arbiter 202 grants back-to-back requests from a single initiator device node to a single target device node at a minimum spacing of four clock cycles. This releases the target device nodes from reserving four extra buffers to take care of back-to-back transactions to the same targets.

In another embodiment of the invention, there are multiple device nodes 300 requesting for the bus grant. Bus arbiter 202 grants the bus cycles to device nodes 300 based on the values of the parameters for arbitration. In case of the tie, the round-robin criterion is used to make arbitration decision. Back-to-back grants may be given to different device nodes 300 based on the arbitration decision in each arbitration cycle.

According to various embodiments of the invention, a method for arbitrating bus cycles among a plurality of device nodes is provided. The method comprises receiving requests for bus grant from the plurality of device nodes, wherein each request comprises values of one or more parameters for arbitration; comparing the requests, in groups of two requests, over one or more stages of comparison, to select a winner device node, wherein the comparison is based on the values of the one or more parameters; and granting the bus to the winner device node.

In another embodiment of the invention, a method for arbitrating bus cycles among a plurality of device nodes is provided. The method comprises receiving requests for bus grant from the plurality of device nodes, wherein each request comprises values of one or more parameters for arbitration; forming groups of requests at a first stage, wherein each group comprises two requests; comparing the requests on each parameter, to select parameter-based winner device nodes within each group; comparing the parameter-based winner device nodes to select a first stage winner device node from each group; comparing the first stage winner device nodes iteratively over one or more stages to select a winner device node; and granting the bus to the winner device node.

In yet another embodiment of the invention, a system for arbitrating bus cycles among a plurality of device nodes is provided. The system comprises a plurality of device nodes, each device node comprising means for making a request for bus grant, the request comprising values of one or more parameters for arbitration. Further, the system comprises a bus, the bus transferring data between the device nodes, wherein the bus comprises means for synchronizing bus operation. The system also comprises a bus arbiter, wherein the bus arbiter comprises means for receiving the requests from the plurality of device nodes, each request comprising values of one or more parameters for arbitration; means for receiving device node numbers of winner device nodes in previous arbitrations of bus cycles, from a last grant vector; and one or more binary comparators, each binary comparator adapted to compare two requests to select one device node.

In various embodiments of the invention, an apparatus for arbitrating a bus in a multiple device node system is provided. The apparatus comprises a processing system including a processor coupled to a display and user input device; and a machine-readable medium including instructions executable by the processor. The instructions comprise means for receiving requests for bus grant from the plurality of device nodes, wherein each request comprises values of one or more parameters for arbitration; means for comparing the requests, in groups of two requests, over one or more stages of comparison to select a winner device node, wherein the comparison is based on the values of the parameters; and means for granting the bus.

In other embodiments, a computer program product for a bus arbitration algorithm is provided. The computer program product comprises a computer readable medium comprising one or more instructions for receiving requests for bus grant from the plurality of device nodes, wherein each request comprises values of one or more parameters for arbitration; one or more instructions for comparing the requests, in groups of two requests, over one or more stages of comparison, to select a winner device node, wherein the comparison is based on the values of the parameters; and one or more instructions for granting the bus.

Embodiments of the invention provide a bus arbitration algorithm related to packet-bus interface. Embodiments of the invention provide a scalable method, in terms of device nodes. As the number of device nodes participating in the bus-arbitration increase, more binary comparators are incorporated. Embodiments of the invention provide another advantage of scalability in terms of the arbitration parameters. As the number of arbitration parameters increases, hardware and software in binary comparators may be modified without requiring much effort.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain or store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an" and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Also in the description herein for embodiments of the present invention, a portion of the disclosure recited in the specification may contain material, which is subject to copyright protection. Computer program source code, object code, instructions, text or other functional information that is executable by a machine may be included in an appendix, tables, figures or in other forms. The copyright owner has no objection to the facsimile reproduction of the specification as filled in the Patent and Trademark Office. Otherwise all copyrights are reserved.

What is claimed is:

1. A method for arbitrating bus cycles among a plurality of device nodes, the method comprising:
   receiving requests for bus grant from the plurality of device nodes, wherein each request comprises values of one or more parameters for arbitration;
   receiving a last grant vector, wherein the last grant vector comprises device node numbers of winner device nodes of previous arbitrations of bus cycles;
   comparing the requests, in groups of two requests, over one or more stages of comparison, to select a winner device node, wherein the comparison is based on the values of the one or more parameters; and
   granting the bus to the winner device node.

2. The method of claim 1, wherein comparing the requests, in groups of two requests, over the one or more stages of comparison, to select the winner device node comprises:
   forming groups of requests at a first stage, wherein each group comprises two requests;
   comparing the requests to select one device node from each group; and
   comparing the selected device nodes iteratively over the one or more stages to select the winner device node.

3. The method of claim 2, wherein a number of groups is half a number of the device nodes if the number of the device nodes is even, and, the number of groups is rounded up to the nearest integer from half the number of the device nodes, if the number of the device nodes is odd.

4. The method of claim 2, wherein comparing the requests to select one device node from each group comprises:
   comparing the requests based on each parameter to select parameter-based winner device nodes; and
   comparing the parameter-based winner device nodes to select the one device node.

5. The method of claim 1, wherein each request comprises a device node number of the device node making the request.

6. The method of claim 1, wherein the one or more parameters include a priority of a device node, a priority of the request, number of bytes per second, a round-robin criterion, or a byte count of data packets in the request.

7. The method of claim 6, wherein the priority of the device node and the priority of the request can have one or more digital bits.

8. The method of claim 1, wherein the last grant vector is used when one of the parameters includes a round-robin criterion.

9. The method of claim 1, wherein the last grant vector is used to break a tie between two requests based on the comparison.

10. The method of claim 9, wherein the device nodes other than device nodes for the winner device nodes of previous arbitrations of bus cycles are determined to win the tie.

11. A method for arbitrating bus cycles among a plurality of device nodes, the method comprising:
   receiving requests for bus grant from the plurality of device nodes, wherein each request comprises values of one or more parameters for arbitration;
   forming groups of requests at a first stage, wherein each group comprises two requests;
   comparing the requests on each parameter, to select parameter-based winner device nodes within each group;
   comparing the parameter-based winner device nodes to select a first stage winner device node from each group;

receiving a last grant vector, wherein the last grant vector comprises device node numbers of winner device nodes of the first stage winners from each group;

comparing the first stage winner device nodes iteratively over one or more stages to select a winner device node; and granting the bus to the winner device node.

12. A system for arbitrating bus cycles among a plurality of device nodes, the system comprising:

a plurality of device nodes, each device node comprising means for making a request for bus grant, the request comprising values of one or more parameters for arbitration;

a bus, the bus transferring data between the device nodes, the bus comprising means for synchronizing bus operation; and a bus arbiter, the bus arbiter comprising:

means for receiving the requests from the plurality of device nodes, each request comprising values of one or more parameters for arbitration;

means for receiving device node numbers of winner device nodes in previous arbitrations of bus cycles, from a last grant vector; and one or more binary comparators, each binary comparator adapted to compare two requests to select one device node.

13. The system of claim 12, wherein each binary comparator comprises:

means for comparing the two requests based on each parameter to select parameter-based winner device nodes; and means for comparing the parameter-based winners to select the one device node.

14. An apparatus for arbitrating a bus in a multiple device node system, the apparatus comprising:

a processing system including a processor coupled to a display and user input device;

a machine-readable medium including instructions executable by the processor comprising:

means for receiving requests for bus grant from the plurality of device nodes, wherein each request comprises values of one or more parameters for arbitration;

means for receiving a last grant vector, wherein the last grant vector comprises device node numbers of winner device nodes of previous arbitrations of bus cycles;

means for comparing the requests, in groups of two requests, over one or more stages of comparison to select a winner device node, wherein the comparison is based on the values of the parameters; and means for granting the bus.

15. The apparatus of claim 14, wherein the last grant vector is used to break a tie between two requests based on the comparison.

16. The apparatus of claim 15, wherein the device nodes other than device nodes for the winner device nodes of previous arbitrations of bus cycles are determined to win the tie.

17. A computer program product for a bus arbitration algorithm, the computer program product comprising a computer readable medium comprising:

one or more instructions for receiving requests for bus grant from the plurality of device nodes, wherein each request comprises values of one or more parameters for arbitration;

one or more instructions for receiving a last grant vector, wherein the last grant vector comprises device node numbers of winner device nodes of previous arbitrations of bus cycles;

one or more instructions for comparing the requests, in groups of two requests, over one or more stages of comparison, to select a winner device node, wherein the comparison is based on the values of the parameters; and one or more instructions for granting the bus.

18. The computer program product of claim 17, wherein the last grant vector is used to break a tie between two requests based on the comparison.

19. The computer program product of claim 18, wherein the device nodes other than device nodes for the winner device nodes of previous arbitrations of bus cycles are determined to win the tie.

20. The computer program product of claim 17, wherein the last grant vector is used when one of the parameters includes a round-robin criterion.

* * * * *